United States Patent
Dean et al.

(10) Patent No.: US 6,237,059 B1
(45) Date of Patent: *May 22, 2001

(54) METHOD FOR ESTIMATING STATISTICS OF PROPERTIES OF MEMORY SYSTEM INTERACTIONS AMONG CONTEXTS IN A COMPUTER SYSTEM

(75) Inventors: Jeffrey A. Dean, Menlo Park; Carl A. Waldspurger, Atherton, both of CA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,398

(22) Filed: Nov. 26, 1997

(51) Int. Cl.[7] ...................................................... G06F 12/00
(52) U.S. Cl. ......................... 711/100; 711/154; 711/156; 711/144; 714/47; 714/50
(58) Field of Search ..................................... 711/118, 144, 711/122, 128, 154, 141, 156, 136, 100, 145; 714/37, 47, 50; 395/183.03, 184.01

(56) References Cited

U.S. PATENT DOCUMENTS

| | | | |
|---|---|---|---|
| 4,084,231 | 4/1978 | Capozzi et al. | 364/200 |
| 4,481,583 | 11/1984 | Mueller | 364/300 |
| 4,583,165 | 4/1986 | Rosenfeld | 364/200 |
| 4,590,550 | 5/1986 | Eilert et al. | 364/200 |
| 4,800,521 | 1/1989 | Carter et al. | 364/900 |
| 4,821,178 | 4/1989 | Levin et al. | 364/200 |
| 4,845,615 | 7/1989 | Blasciak | 364/200 |
| 5,103,394 | 4/1992 | Blasciak | 395/575 |
| 5,151,981 | 9/1992 | Westcott et al. | 395/375 |
| 5,269,017 | 12/1993 | Hayden et al. | 395/575 |

(List continued on next page.)

FOREIGN PATENT DOCUMENTS

| | | | |
|---|---|---|---|
| 0 086 380 A2 | 8/1986 | (EP) | G11C/9/06 |
| 0 458 127 A2 | 11/1991 | (EP) . | |
| 0 465 765 A2 | 1/1992 | (EP) | G06F/11/34 |
| 0 689 141 A2 | 12/1995 | (EP) | G06F/11/34 |
| 0 766 177 A1 | 4/1997 | (EP) | G06F/12/10 |

OTHER PUBLICATIONS

M. Martonosi, et al."MemSpy: Analysing Memory System Bottlenecks in Programs"; Proceedings of the 1992 ACM Sigmetrics and Performance '92 International Conference on Measurement and Modeling of Computer Systems, Jun 1–5, 1992, pp. 1–12, XPOO2123303.
Abraham et al., Predicting Load Latencies Using Cache Profiling, HPL–94–110, Nov. 1994, copyright Hewlett–Packard Co.

(List continued on next page.)

Primary Examiner—Do Hyun Yoo
Assistant Examiner—Nasser Moazzami
(74) Attorney, Agent, or Firm—Oppenheimer Wolff & Donnelly LLP (57) ABSTRACT

A method analyzes memory transaction processed by memories of a computer system. The method selects a set of addresses of the memories. State information from a plurality of consecutive predetermined memory transactions to the selected addresses are recorded while the selected transactions are processed by the memories. The selecting and the recording steps are repeated until a termination condition is reached. Then, the recorded state information is statistically analyzed to estimate statistics of properties of the memory interactions among contexts in the computer system.

23 Claims, 7 Drawing Sheets

U.S. PATENT DOCUMENTS

| | | | |
|---|---|---|---|
| 5,287,508 | | 2/1994 | Hejna, Jr. et al. .................... 395/650 |
| 5,301,299 | * | 4/1994 | Pawlowski et al. ...................... 711/5 |
| 5,321,836 | | 6/1994 | Crawford et al. .................... 395/400 |
| 5,339,425 | | 8/1994 | Vanderah et al. .................... 395/700 |
| 5,379,427 | | 1/1995 | Hiroshima ............................ 395/650 |
| 5,379,432 | | 1/1995 | Orton et al. ......................... 395/700 |
| 5,388,242 | | 2/1995 | Jewett ................................. 395/425 |
| 5,418,973 | | 5/1995 | Ellis et al. ........................... 395/800 |
| 5,446,876 | | 8/1995 | Levine et al. .................... 395/184.01 |
| 5,450,349 | * | 9/1995 | Brown, III et al. ............ 395/183.03 |
| 5,450,586 | | 9/1995 | Kuzara et al. ........................ 395/700 |
| 5,450,609 | | 9/1995 | Schultz et al. ........................ 395/800 |
| 5,452,440 | * | 9/1995 | Salsburg ................................ 771/136 |
| 5,463,775 | | 10/1995 | De Witt et al. .................. 395/184.01 |
| 5,479,629 | | 12/1995 | Angjelo et al. ...................... 395/416 |
| 5,479,652 | | 12/1995 | Dreyer et al. ................... 395/183.06 |
| 5,485,574 | | 1/1996 | Bolosky et al. ................. 395/183.11 |
| 5,493,673 | | 2/1996 | Rindos et al. ........................ 395/550 |
| 5,515,538 | | 5/1996 | Kleiman ............................... 395/733 |
| 5,528,753 | | 6/1996 | Fortin ............................. 395/183.11 |
| 5,530,964 | | 6/1996 | Alpert et al. ........................ 395/700 |
| 5,537,541 | | 7/1996 | Wibecan ........................ 395/183.21 |
| 5,572,672 | | 11/1996 | Dewitt et al. .................... 395/184.01 |
| 5,581,482 | | 12/1996 | Weidenman et al. ........... 364/551.01 |
| 5,581,745 | | 12/1996 | Muroaka et al. ..................... 395/557 |
| 5,594,741 | | 1/1997 | Kinzelman et al. ................... 371/27 |
| 5,594,864 | | 1/1997 | Trauben .......................... 395/183.15 |
| 5,603,004 | | 2/1997 | Kurpanek et al. ................... 395/445 |
| 5,608,892 | | 3/1997 | Wakerly .............................. 395/445 |
| 5,623,627 | | 4/1997 | Witt ...................................... 395/449 |
| 5,630,157 | | 5/1997 | Dwyer, III .......................... 395/800 |
| 5,649,136 | | 7/1997 | Shen et al. ........................... 395/591 |
| 5,651,112 | | 7/1997 | Matsuno et al. ................ 395/184.01 |
| 5,691,920 | | 11/1997 | Levine et al. .................... 364/551.01 |
| 5,748,468 | | 5/1998 | Notenboom et al. ................ 364/132 |
| 5,751,945 | | 5/1998 | Levine et al. ................... 395/184.01 |
| 5,765,204 | | 6/1998 | Bakke et al. ......................... 711/202 |
| 5,768,500 | * | 6/1998 | Agrawal et al. ................ 395/184.01 |
| 5,774,718 | | 6/1998 | Aoshima et al. .................... 395/670 |
| 5,799,143 | | 8/1998 | Butt et al. ........................ 395/183.14 |
| 5,802,378 | * | 9/1998 | Arndt et al. ........................ 395/740 |
| 5,802,386 | | 9/1998 | Kahle et al. ..................... 395/800.23 |
| 5,802,593 | | 9/1998 | Grimsrud ............................ 711/165 |
| 5,809,450 | | 9/1998 | Chrysos et al. ...................... 702/186 |
| 5,854,934 | | 12/1998 | Hsu et al. ............................. 395/709 |
| 5,857,097 | | 1/1999 | Henzinger et al. .................. 395/583 |
| 5,860,018 | | 1/1999 | Panwar ........................... 395/800.23 |
| 5,862,371 | * | 1/1999 | Levine et al. ........................ 712/228 |
| 5,878,208 | | 3/1999 | Levine et al. ................... 395/183.14 |
| 5,884,080 | | 3/1999 | Blandy et al. ........................ 395/704 |
| 5,922,070 | | 7/1999 | Swoboda ............................. 712/244 |
| 5,923,872 | | 7/1999 | Chrysos et al. ...................... 595/591 |
| 5,933,626 | | 8/1999 | Mahalingaiah et al. ............. 395/568 |
| 5,944,841 | | 8/1999 | Christie ................................ 714/38 |
| 5,964,867 | | 10/1999 | Anderson et al. .................... 712/219 |
| 5,987,598 | | 11/1999 | Levine et al. ......................... 712/227 |
| 6,000,044 | | 12/1999 | Chrysos et al. ........................ 714/47 |
| 6,070,009 | * | 5/2000 | Dean et al. .......................... 395/704 |
| 6,092,180 | * | 7/2000 | Anderson et al. ................... 712/200 |
| 6,119,075 | * | 9/2000 | Dean et al. ........................... 702/186 |

OTHER PUBLICATIONS

Anderson et al., Continuous Profiling: Where Have All the Cycles Gone? To be published in The Proceedings of the 16$^{th}$ ACM Symposium on Operating Systems Principles, copyright 1997 by the Assoc. for Computing Machinery.

Ball et al., Efficient Path Profiling, Published in Proceedings of MICRO–29, Dec. 2–4, 1996, in Paris, France, pp. 46–57. Copyright 1996 IEEE.

Bershad et al., Avoiding Conflict Misses Dynamically in Large Direct–Mapped Caches, Proceedings of the 6$^{th}$ International Conference on Architectural Support for Programming Languages and Operating Systems, pp. 158–170, Oct. 4–7, 1994.

Cohn et al., Hot Cold Optimization of Large Windows/NT Applications, Proceedings of the 29$^{th}$ Annual International Symposium on Microarchitecture, pp. 80–89, Dec. 1996. Copyright 1996 IEEE.

Conte et al., Using Branch Handling Hardware to Support Profile–Driven Optimization, Proceedings of the 1994 27$^{th}$ Annual International Symposium on Microarchitecture, Nov. 30–Dec. 2, 1994, San Jose, Calif.

Conte et al., Accurate and Practical Profile–Driven Compilation Using the Profile Buffer, Proceedings of the 29$^{th}$ Annual International Symposium on Microarchitecture, pp. 36–45, Dec. 2–4, 1996.

Fisher, J.A., Global Code Generation for Instruction–Level Parallelism: Trace Scheduling–2, Hewlett–Packard Technical Report No. HPL–93–43, Jun., 1993. To be published by Springer–Verlag, London, UK.

Horowitz et al., Informing Memory Operations: Providing Memory Performance Feedback in Modern Processors, Proceedings of the 23$^{rd}$ Annual International Symposium on Computer Architecture, pp. 260–270, May 22–24, 1996.

Hwu et al., The Superblock: An Effective Technique for VLIW and Superscalar Compilation, Center for Reliable and High–Performance Computing, Univ. of Illinois, Urbana–Champaign, Illinois, 61801.

Romer et al., Dynamic Page Mapping Policies for Cache Conflict Resolution on Standard Hardware, Proceedings of the First Symposium for Operating Systems Design and Implementation, pp. 255–266, 1994.

Romer et al., Reducing TLB and Memory Overhead Using Online Superpage Promotion, Proceedings of the 22$^{nd}$ Annual International Symposium on Computer Architecture, pp. 176–187, Jun. 1995.

Tullsen et al., Exploiting Choice: Instruction Fetch and Issue on an Implementable Simultaneous Multithreading Processor, Proceedings of the 23$^{rd}$ Annual International Symposium on Computer Architecture, Philadelphia, PA, May, 1996.

Tullsen et al., Simultaneous Multithreading: Maximizing On–Chip Parallelism, Proceedings of the 22$^{nd}$ Annual International Symposium on Computer Architecture, Santa Margherita Ligure, Italy, Jun. 1995.

Verghese et al., Operating System Support for Improving Data Locality on CC–NUMA Compute Servers, Proceedings of the 7$^{th}$ International Conference on Architectural Support for Programming Languages and Operating Systems, pp. 279–289, Oct. 1–5, 1996.

Young et al., Improving the Accuracy of Static Branch Prediction Using Branch Correlation, Proceedings of the 6$^{th}$ International Conference on Architectural Support for Programming Languages and Operating Systems, pp. 232–241, Oct. 4–7, 1994.

IBM Technical Disclosure Bulletin, "Instruction Set Execution Frequency Estimation by of Program Counter Sampling", Mar. 1991, p. 203.

IBM Technical Disclosure Bulletin, "Instruction Match Function for Processor Performance Monitoring", Dec. 1996, vol. 39, No. 12, pp. 119–121.

Kay, et al., "A Fair Share Scheduler", Communication of the ACM, Jan., 1998, vol. 31 No. 1, pp.44–55.

Custer, "Inside Windows NT", Microsoft Press, Dec. 1993, p. 93.

Hellerstein, "Achieving Service Rate Objectives With Decay Usage Scheduling", IEEE Transactions on Software Engineering, Aug. 1993, vol. 19, No. 8, pp. 813–825.

IBM Technical Disclosure Bulletin, "Technique For Speculatively Sampling Performance Parameters", Sep. 1994, vol. 37, No. 9, pp. 589–591.

IBM Technical Disclosure Bulletin, "Processor Performance Monitoring With a Depiction of the Efficiency of the Cache Coherency Protocol of a Superscalar Microprocessor in an Symmetric Multiple Processor Environment", Jan. 1997, vol. 40, No. 01, pp. 79–81.

Martonosi, et al., "MemSpy: Analyzing Memory System Bottlenecks in Programs" Performance Evaluation Review, Jun. 1992, vol. 20, No. 1, pp. 1–12.

IBM Technical Disclosure Bulletin, "Automatic Program Reordering for Data References in Unified Cache", Apr., 1996, vol. 39, No. 04, pp. 117–118.

IBM Technical Disclosure Bulletin, "Technique for Speculatively Sampling Performance Parameters", Sep. 1994, vol. 37, No. 09, pp. 589–592.

Roth, et al., "Performance Monitoring on the PowerPC™ 604 Microprocessor", XP 000631915, Feb. 10, 1995.

Ammons, et al., "Exploiting Hardware Performance Counters with Flow and Context Sensitive Profiling", ACM, 1997, pp. 85–96.

Hichsk, et al., "ProfileMe: Hardware Support for Instruction–Level Profiling on Out–of–Order Processors" IEEE Electronic Library, 1997, pp. 292–302.

Siegle, et al., "Monitoring Program Behaviour on SUPRENUM", ACM, 1992, pp. 332–341.

* cited by examiner

METHOD FOR ESTIMATING STATISTICS OF PROPERTIES OF MEMORY SYSTEM INTERACTIONS AMONG CONTEXTS IN A COMPUTER SYSTEM

This application is related to: U.S. patent applications Ser. Nos. 08/980,170, which is now abandoned, and 08/980,167, 08/980,105, 08/977,438, 08/980,124, 08/980,189, 08/979,033, 08/979,034, 08/980,168, 08/979,822, 08/980,165, 08/979,899 now U.S. Pat. No. 5,809,450, U.S. Ser. No. 08/980,190 now U.S. Pat. No. 6,000,044, U.S. Ser. No. 08/980,166 now U.S. Pat. No. 6,070,009, U.S. Ser. No. 08/980,145 now U.S. Pat. No. 5,964,867, U.S. Ser. No. 08/809,035 now U.S. Pat. No. 6,092,180, U.S. Ser. No. 08/980,164 now U.S. Pat. No. 6,119,075, and U.S. Ser. No. 08/979,848 now U.S. Pat. No. 5,923,872; and U.S. Pat. Nos. 5,923,872 and 5,809,450; all of which are assigned to the assignee of the present application.

FIELD OF THE INVENTION

The present invention relates generally to measuring the performance of computer systems, and more particularly to estimating statistics of properties of memory sub-systems.

BACKGROUND OF THE INVENTION

The speed at which modern computer systems operate is often limited by the performance of their memory sub-systems, such as caches and other levels of a hierarchical memory subsystem containing SRAM, DRAM, disks and the like. Cache memories are intended to store data that share spatial and temporal localities. Other memories can store data in any number of organized manners, short term and long term.

In order to analyze and optimize the performance of memory transactions, better measuring tools are required. Currently, there are very few tools that can accurately measure and capture detailed information characterizing memory transactions.

Existing hardware event counters can detect discrete events related to specific memory transactions, such as cache references, or cache misses, but known event counters provide little detail that would allow one to exactly deduce the causes of performance debilitating events, and how such events could be avoided.

For example, currently it is extremely difficult to obtain information about the status of a cache block, such as clean or dirty, or shared or non-shared, while data are accessed. It is also very difficult to determine which memory addresses are actually resident in the cache, or which memory addresses are conflicting for a particular cache block, because existing systems do not provide an easy way to obtain the virtual and physical address of the data that are accessed.

Similarly, it is difficult to ascertain the source of a particular memory reference that caused a performance debilitating event. The source might be an instruction executed in the processor pipeline on behalf of a particular context (e.g., process, thread, hardware context, and/or address space number), it might be a memory request that is external to the processor pipeline, such as direct memory access (DMA) originating from various input/output devices, or it may be a cache-coherency message originating from other processors in a multiprocessor computer system. Sampling accesses to specific regions of memories, such as specific blocks in lines of a cache, physical addresses in a main memory, or page addresses in a virtual memory is even more difficult.

It may be possible, using simulation or instrumentation, to track memory addresses for processor initiated accesses, such as those due to load and store instructions. However, simulation and instrumentation techniques usually disturb the true operation of the system enough to give less than optimal measurements, particularly for large scale systems with real production workloads. Also, because instrumentation techniques modify or augment programs, they inherently alter memory and cache layouts, distorting the memory performance of the original system. For example, instruction cache conflicts may differ significantly between instrumented and uninstrumented versions of a program.

However, when the memory accesses are due to some event, such as a DMA transaction or a cache coherency transaction in a multi-processor, tracking accessed addresses can usually only be done by specialized hardware designed specifically for that part of the memory subsystem which is to be monitored.

In addition, in order to optimize operating system and application software, it would be useful to be able to obtain other types of information about memory transactions, such as the amount of memory that is used by different execution threads or processes, and the amount of time required to complete a particular memory transaction. Furthermore, it would be even more useful if the information could be used to optimize instruction scheduling and data allocation, perhaps even while the system is operating under a real workload.

SUMMARY OF THE INVENTION

A method analyzes memory transaction processed by memories of a computer system is provided. The method selects a set of addresses of the memories. State information from a plurality of consecutive predetermined memory transactions to the selected addresses are recorded while the selected transactions are processed by the memories. The selecting and the recording steps are repeated until a termination condition is reached. Then, the recorded state information is statistically analyzed to estimate statistics of properties of the memory interactions among contexts in the computer system.

DETAILED DESCRIPTION OF THE PREFERRED EMBODIMENT

System Overview

Figure 1:
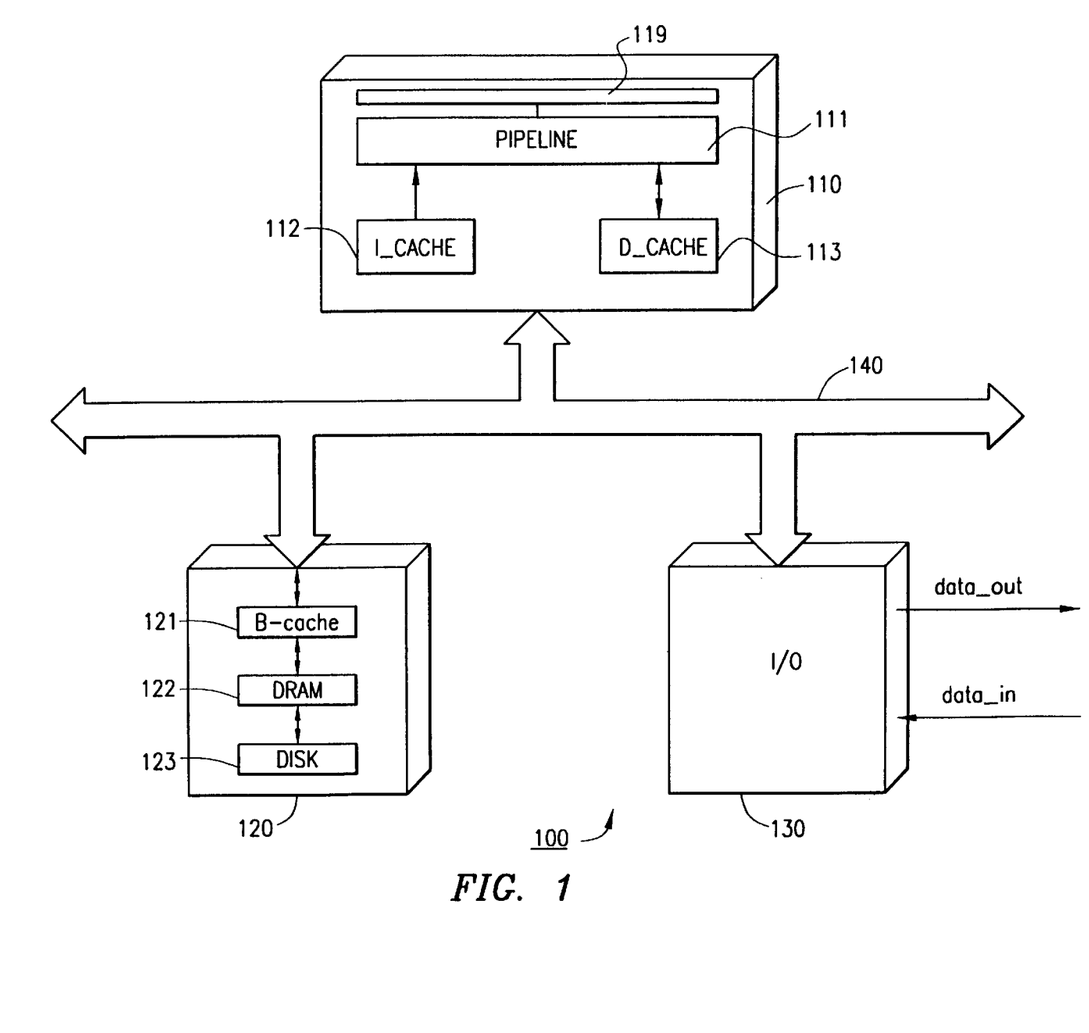
FIG. 1 is a block diagram of a computer system with memory transaction sampling according to the invention.

FIG. 1 shows a computer system 100 which can use the memory transaction sampling techniques as described herein. The system 100 includes one or more processors 110, memories 120, and input/output interfaces (I/O) 130 connected by bus lines 140.

Each processor 110 can be implemented on an integrated semi-conductor chip including a processor pipeline 111, a data-cache (D-cache) 113, and an instruction cache (I-cache) 112, for example, the Digital Equipment Corporation Alpha 21264 processor. The pipeline 111 can include a plurality of serially arranged stages for processing instructions, such as a fetch unit, a map unit, an issue unit, one or more execution units, and a retire unit. The processor chip also includes hardware 119 described in greater detail below for sampling cache state information while accessing data stored at addresses in the various memories.

The memories 120 can be arranged hierarchically, including a board-level cache (B-cache) 121, volatile memories (DRAM) 122, and persistent memories (disk) 123. The I/O 130 can be used to input and output data to and from the system 100 using I/O devices such as memory channels to other processors, keyboards, monitors, and network controllers to other computer systems.

Memory Transaction

In general, a memory transaction is defined herein as any operation which causes data to move from one location to another, for example, loads and stores, direct memory access (DMA) operations, and coherency transactions in the case where multiple processors or execution threads access data concurrently.

Operation

During operation of the system 100, instructions and data of software programs are stored in the memories 120. The instructions are generated conventionally using known compiler, linker, and loader techniques. The instructions are transferred into the pipeline 111 of one of the processors 110 via the I-cache 112, and the data via the D-cache 113. In the pipeline 111, the instructions are decoded for execution.

The instruction cache (I-cache) 112 is accessed by the pipeline to fetch instructions that are executed by the processor pipeline 111. Some of the instructions, for example load and store instructions, access data (R/W) stored in the memories via the D-cache 113. Other instructions, such as branch and jump instructions, control the execution flow of the programs. Data can also be transferred via direct memory access (DMA) and cache coherency operations. It is desired to collect detailed performance information while data in any of the memories are accessed.

Memory Transaction Sampling

Figure 2:
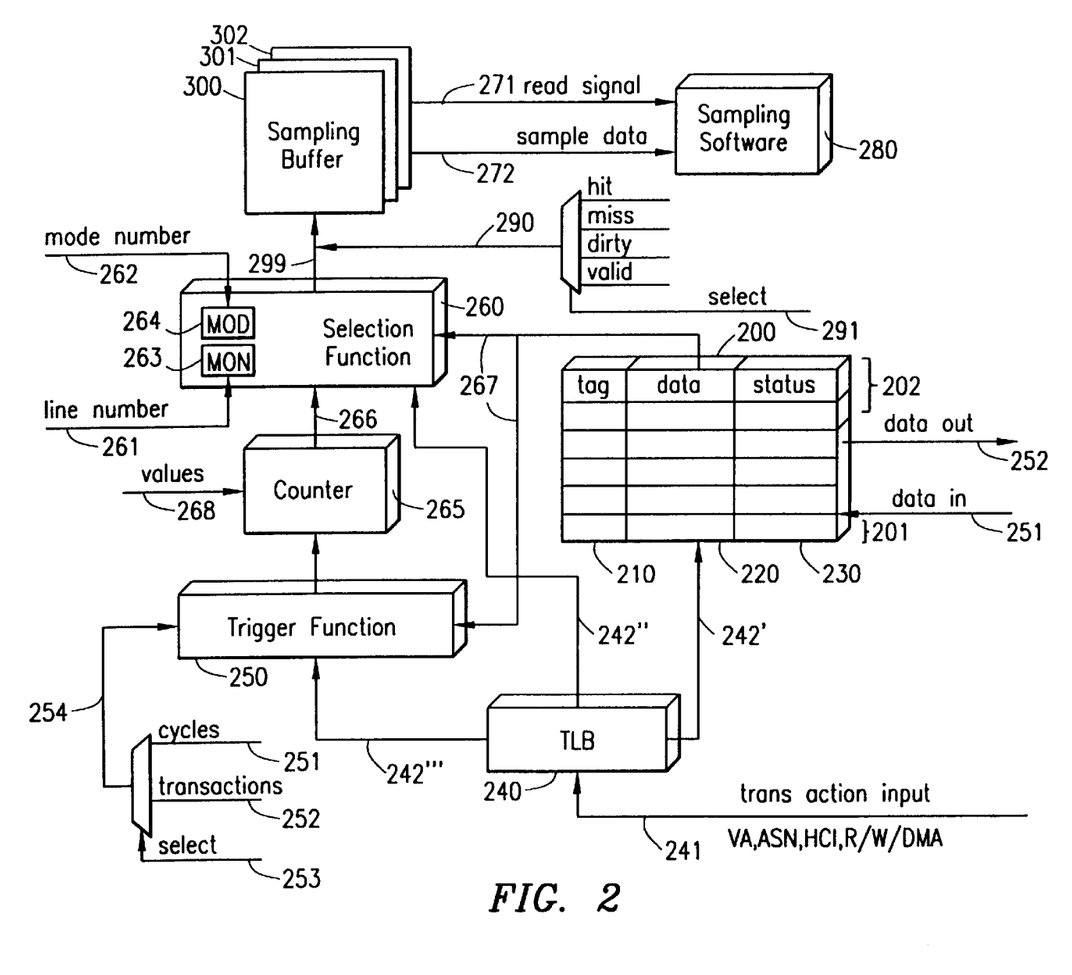
FIG. 2 is a block diagram of sampling hardware for monitoring memory performance according to a preferred embodiment.

FIG. 2 shows an arrangement for sampling memory transactions. A cache 200 includes a plurality of lines 202. The cache can be direct-mapped, or set-associative. Each line consists of one or more blocks 201. Lines in a direct mapped cache will contain only a single block, while lines in an N-way set-associative cache will each contain N blocks.

For example, in a four-way set-associative cache, one line will store data of four different memory addresses that have some number of low-order address bits in common. During an access, after the line has been referenced by the cache line index, each block has to be examined to determine if the line stores the required data. This is done with a tag 210.The exact details of how the blocks are examined depends on the implementation of the setassociative cache. Also, associated with each block are the data 220, and status information 230. Different physical hardware can be used for storing the tags, data, and status.

The arrangement shown in FIG. 2 also includes a translation-lookaside buffet (TLB) 240, a trigger function 250, a counter 265, a selection function 260, sampling buffers 301–303, and sampling software 260.

During operation of the system, transaction input 241 is presented to the translation-lookaside buffer (TLB) 240 on line 241. The transaction input can include a virtual address (VA), a context identifier such as an address space number (ASN), and in the case of a multi-threaded processor design, a hardware context identifier (HCI). The input also can include the type of the access operation to be performed (R/W/DMA).

The TLB 240 translates the virtual address to a physical address. A portion of the address (the physical address for a physically-indexed cache, or the virtual address for a virtually-indexed cache) typically consisting of some number of low-order (e.g. 8–16) bits, are used to form an index into the cache 200 on line 242'. The index selects a particular cache line 202.

A lookup operation is then performed on each of the blocks 201 within the selected cache line 202 to determine if the appropriate data are resident in the blocks of the line. Depending on the access operation, data can respectively be read or written on lines 251 and 252.

If the appropriate data are not found at any of the blocks within the line, then other data are evicted from the cache to make room for the new data. If the evicted data are dirty, i.e., the version of the data stored in the cache is modified and the copies of the dirty data stored in surrounding levels of the memory hierarchy are not consistent, then the evicted data may need to be written back to appropriate addresses in the surrounding levels of the memory hierarchy to maintain consistency.

The goal is to sample memory system transactions in order to gain evidence about the behavior of the memory system and programs executing on the computer system. Each memory transaction is inspected as it enters the memory system to determine if this particular transaction should be selected for sampling. Two functions control which transactions to sample: the trigger function 250; and the selection function 260.

The trigger function 250 determines when the selection function 260 should be activated, while the selection function 260 determines which memory transactions should be sampled, once the trigger function has activated the selection function. In the most general case, each of these functions can operate as a function of any memory system or memory transaction state.

Selection Function

The selection function 260 is enabled via an enable line 266 that turns on the selection function when the counter 265 reaches a specified value. The maintenance of the value is described below. The selection function accepts as input information about the transaction on line 242", as well as status information about the transaction on line 267. The job of the selection function is to decide if the transaction is of interest, and if so, to forward information about the transaction to the sampling buffer 300 via line 299.

In the general case, a monitor register (MON) 263 inside the selection function logic stores state used to match against memory system transactions. In the particular case of monitoring accesses to a specific cache block, the monitor register 263 can store the numbers of one or more blocks to be monitored. The monitor register contents (such as block numbers) can be loaded into the register by hardware or software via line 261. Addresses of other regions of memory can also be stored in the monitor register.

One way the selection function 260 can be implemented is by predefining a set of different selection functions, and employing a mode register 264 within the selection function. The mode register 264 can be loaded with a mode value via line 262 to control the particular predefined selection function to use during sampling. The various selection function modes might include functions that select transactions that:

reference a particular level in the memory hierarchy;

reference a particular region of memory within a particular level of the memory hierarchy. The particular region can include one or more cache blocks within one or more cache lines, one or more cache lines, or one or more contiguous regions of main memory addressed by either virtual or physical addresses;

have a particular type, e.g. read, write, or invalidate;

hit in a particular cache memory;

miss in a particular cache memory;

cause a particular cache protocol state transition e.g., dirty evictions;

originate from a particular source, e.g., an instruction executing in the processor pipeline, an instruction execution from a particular context, process, thread, or address space, direct memory access from an input/output device, or cache coherency messages in a multiprocessor computer system.

Selection functions can additionally be composed using boolean combinations (AND, OR, and NOT) of these selection criteria. Alternatively, the selection function can be implemented with programmable logic controlled by software to provide additional flexibility.

After the selection function has identified a memory transaction to be sampled, the state information is captured and recorded in one of the sampling buffers 300–302. The state information is collected as the selected transaction is processed by the various levels of the memory hierarchy.

Several implementation techniques are possible. For example, a "selected transaction" field (such as a single bit) can be associated with each memory transaction. The field causes logic circuits in the memory system to record information at appropriate points during the processing of the selected transaction when the bit is set. An alternative implementation uses a comparator registers at appropriate points in the memory system hierarchy to compare identifying information from each memory transaction with the identifying information of a selected transaction, and if they match, record relevant state information.

Modes of Operation

Consider the implementation of the selection function using comparator registers to choose selected transactions at each level of the memory hierarchy. Restricting attention to a single level of the memory hierarchy consisting of a single cache memory, the selection function may specify a particular region of the cache to monitor, such as a set of cache blocks. If the index portion of the transaction information carried on line 242 is identical to one of the block indices stored in the monitor register in the selection function 260, then information about the state of the indexed cache block is captured and recorded in one of the sampling buffers as described in detail below.

Some state information can be captured before the transaction is processed by the memory system, and additional state information can be captured after the transaction completes. After a specified number of transactions have been recorded, for example, when any of the sampling buffers 300–302 are full, a read signal can be generated on line 271. The read signal 271 can be in the form of an interrupt, a software pollable value set in a register, or an exception condition.

In response to the read signal, the sampling software 280 can read the state information stored in the sampling buffer for further processing via line 272. It should be noted, that multiple buffers 300–302 can be used to collect multiple samples. Increasing the number of buffers can amortize the cost of sampling overhead, by transferring more than one sample per read signal.

Trigger Function

The loadable counter 265 is initialized with count-down values on line 268. The counter 265 is decremented using trigger events on line 254. Trigger events can be clock cycles on line 251 or transactions on line 252. Which trigger event to use can be selected on line 253.

Whether or not a trigger event on line 254 decrements the counter 265 is controlled by the trigger function 250. The trigger function can be any arbitrary function of the state of a memory transaction which can be determined via information arriving via lines 242' and 267. The function 250 can be implemented with two internal loadable registers as described above for the selection function.

Some specific examples of useful trigger functions include those that match on:

any memory transaction;

memory transactions that reference a particular level of the memory hierarchy, e.g., a particular cache;

memory transactions that hit in a particular level of the memory hierarchy, e.g., a particular cache;

memory transactions that miss in a particular level of the memory hierarchy;

memory transactions that experience certain cache protocol state transitions, e.g., dirty evictions;

memory transactions that access a particular region of memory, e.g., range of addresses, a particular cache line, a particular cache block within a particular cache line, a particular region of the cache, etc.;

memory transactions from a particular source, e.g., from the processor pipeline, from a particular direct memory access (DMA) device, coherency traffic from another processor, etc.; and memory transactions of a particular type, such as read transactions, write transactions, or invalidate transactions;

The use of the trigger function 250 enables the sampling hardware to skip a specified number of transactions before applying the selection function to the stream of memory references. In a sophisticated example, this would allow one to count three accesses to a particular block, and then to gather memory transaction samples for the next two misses to that block.

In another useful example, one can trigger selection after an access to a particular cache block by a particular context (such as a process or thread), and then gather samples for a specified number of subsequent transactions to the same block by different hardware, process, or thread contexts. Therefore, there are two steps to sampling:

1) determining a matching transaction, and then 2) deciding to keep or discard sampling data related to the matching transaction so that sampling can take place both in spatial and temporal dimensions.

The countdown register 265 can be reset via line 268. For random sampling, the initial value written into the countdown register can be chosen randomly from an interval of numbers, and the random number can be computed either in software or via a hardware circuit capable of generating random numbers. It should be noted that the register 265 can also count upwards.

Sampling Buffer

Figure 3:
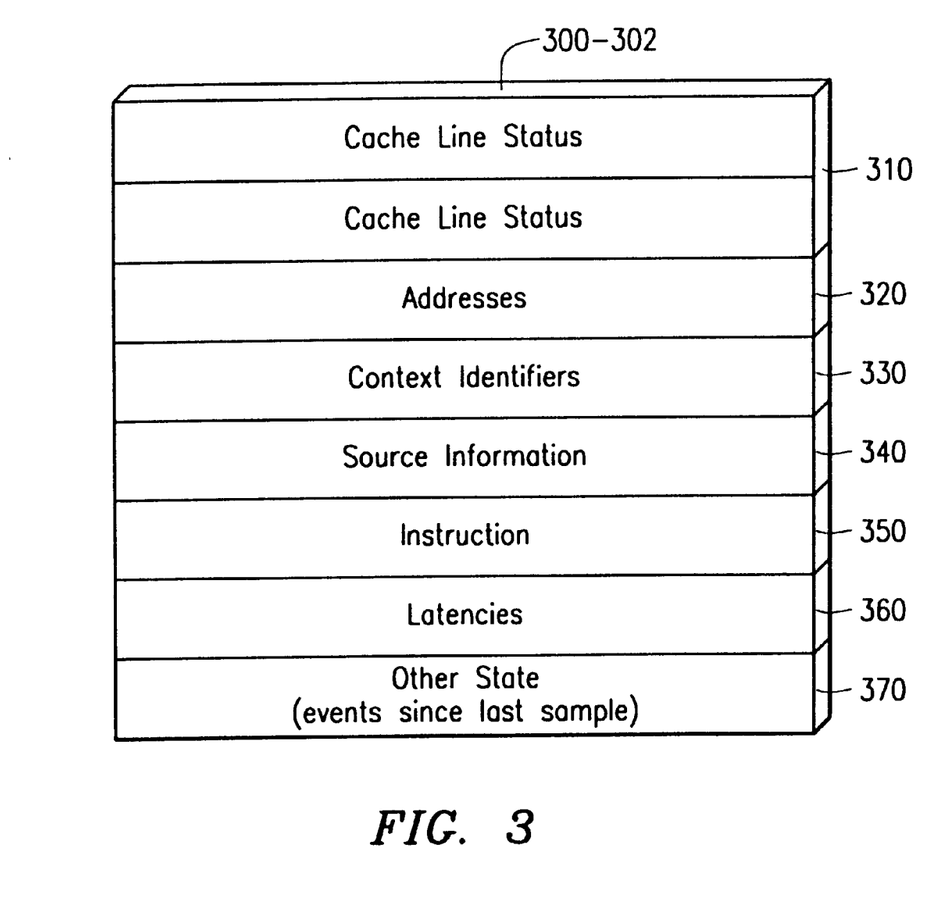
FIG. 3 is a block diagram of a sampling buffer to store sample information.

FIG. 3 shows the details of how one of the buffers 300–302 is allocated. The buffer can be implemented as a set of software readable registers, or other types of memories. The buffer includes a status field 310, an address field 320, a context field 330, an access source field 340, an instruction field 350, a latency field 360, and fields 370 for other states.

The status field 310 can include block status information and cache state protocol information such as whether the block is dirty or clean (modified or not), shared (one or more execution threads can access the data), exclusive (non-shared), valid or invalid (the data are legitimate), and cache hit or miss status. It can also hold information such as the particular line index number and block number accessed by the transaction in a cache memory. If there are multiple levels in the memory hierarchy, then there can be multiple copies of field 310, each field storing status information about the transaction for a particular level of the memory hierarchy.

The address field 320 can store the virtual and/or physical addresses of the data accessed by the transaction being sampled.

One concern for hardware implementation may be the number of wires required to route the physical and virtual addresses to the buffer 300, for example, about 47 wires or so for the virtual address, plus 40 or so wires for the physical address. In computer systems which support software-managed TLBs, the number of wires can be reduced by simply storing the index of the TLB entry that performed the virtual-to-physical translation in the address field 320, along with the offset into the referenced page. Then, the software 280 can read the entry from the specified TLB entry to determine both the virtual and physical addresses.

Note this technique relies on two properties.

The first property requires that the TLB entry of interest has not been replaced between the time the information was recorded and the time the software reads the TLB entry. In cases where the TLB implements some approximation of a least-recently-used (LRU) replacement policy, as will be the general case, this will not be a problem, because the entry in question will have been used recently by virtue of having been involved in a recent cache access.

The second property requires that software can read the TLB entry. In cases where direct reading of the TLB is not possible, software can maintain a shadow copy of the contents of the TLB.

The context field 330 can store the address space number (ASN), the hardware context identifier (HCI) in case of a multi-threaded processor, a process identifier (PID), and/or a thread identifier (TID) of the source of the memory transaction when the source is an instruction execution in the processor pipeline. The field can also store the address space number (ASN) referenced by the memory transaction caused by the instruction.

The source field 340 can be used to store the source of the access, e.g., a load or store instruction, a DMA request, or cache coherency protocol operation, as well as additional information to identify the source.

If the source of the access was an instruction execution, then the program counter (PC) of the instruction that caused the access can be stored in the instruction field 350. The program counter field 350 can also be used to store information about other kinds of sources to save a register). For example, if the source is a coherency operation from another processor in a multiprocessor computer system, then the field 350 can be used to hold the processor number of the processor originating the request that caused the coherency operation. For DMA type of transactions, the identity if the I/O device that initiated the DMA can be stored.

The time interval (latency) between successive accesses and/or the interval from when the request was issued until the data arrives in the processor (or in the case of a write, the interval from when the data was sent to the memory until the data was committed into the memory) can be stored in the latency field 360. The interval can be measured in terms of processor clock cycles, or the interval can be measured in other units such as the number of transactions processed by the memory system. The interval can also be broken down into the time required to process the transaction at each level of the memory hierarchy.

Additional registers such as field 370 can be added to this structure to store additional memory system state that is captured at the time that the sampled memory transaction is processed. This state can include information about memory system transactions that have occurred since the last sample, such as counts of the total number of transactions, or of transactions meeting a particular set of criteria.

As shown in FIG. 2, sample events on line 290 which can be part of the sampled state can include hit/miss, valid/invalid, dirty, and the like. A select signal on line 291 can determine which particular event to sample.

Other state information can also include contents or number of valid entries in memory system structures such as write buffers, victim caches, translation lookaside buffers (TLBs), miss-address files (MAFs), and memory transaction queues.

Random Memory Transaction Sampling Techniques

In a preferred embodiment, transactions which access any level of the memory hierarchy are sampled using at least two modes of operation. In a first mode, accesses to specific regions (addresses) of memories are sampled. In a second mode, randomly selected memory transactions are sampled to estimate the performance of any part of the memory hierarchy.

In the first mode, the most interesting information can be collected by sampling at least two consecutive transactions to the same physical location, by way of example, a cache block. This will reveal cache state transitions.

In the second mode, randomly sampling a large number of transactions over time will allow a statistical analysis to estimate overall memory performance, without seriously impacting the throughput of the system. In other words, random sampling allows one to measure memory performance in actual operational systems.

Therefore, the apparatus and method disclosed herein can sample transactions to: specific cache blocks clean or dirty, specific regions of memories, all memory locations, all memory locations where cache blocks are dirty, to memory locations where the data are not in the cache.

Because cache state transitions are of particular interest, the arrangement shown in FIG. 2 is designed to store copies of state information for at least two consecutive accesses when the mode is cache sampling. The first copy captures information about the state of the cache block after the first access. The state after the second access is stored as the second copy. By comparing these two states, it is possible to determine what transitions must have occurred in the system's cache coherency protocol.

The notion of storing state information for successive transactions can be generalized to sequential accesses that match simple, software-specified criteria, such as successive misses, successive hits, successive invalidations, and so forth. These are different variations on the cache sampling mode set via line 262.

In the preferred embodiment, the state and address information is captured when a cache block is updated, so there is no need to read the cache directly. By capturing the information on its way into the cache 200, the hardware design is simpler because the need to run wires from each cache block to the sampler 270 is avoided. The design can also be simplified by limiting the sampling to a small number of blocks. When only a small number of blocks are concurrently sampling, extra hardware for each cache block is avoided.

By using software to load the monitor register 264, flexible control of a wide range of monitoring techniques to be implemented. For example, if no access activity is detected for a particular cache block within a specified period of time, then the software can abort the monitoring of that block by simply specifying another block to monitor. In another mode, the monitored cache block can be chosen randomly, in order to statistically sample the behavior of each block in the cache. Alternatively, software can sample the blocks in a round-robin order.

It is also possible to selectively monitor a cache block associated with a specified program variable or data structure. Here, software determines which cache block will store a particular variable, and selects that block as the one to monitor. This technique enables programmers to interactively debug memory system performance by identifying conflicts in executing programs that should be investigated. Similar techniques can be used by adaptive run time software to avoid severe cache conflicts through dynamic data relocation.

It should be noted, that the transaction sampling as described herein can be employed for different levels in the memory hierarchy by duplicating the sampling hardware shown in FIG. 2. Note this technique relies on the two TLB properties described above.

The sampling techniques as described herein permit a fine-grained monitoring of memory transactions with low overhead hardware overhead. This information can be used in many ways. For example, the collected information can help system designers to better understand the performance of the memory sub-systems, such as caches, DRAM, and the like. The performance data can be used to guide optimizations.

Estimating Memory Interactions Among Contexts

Figure 4:
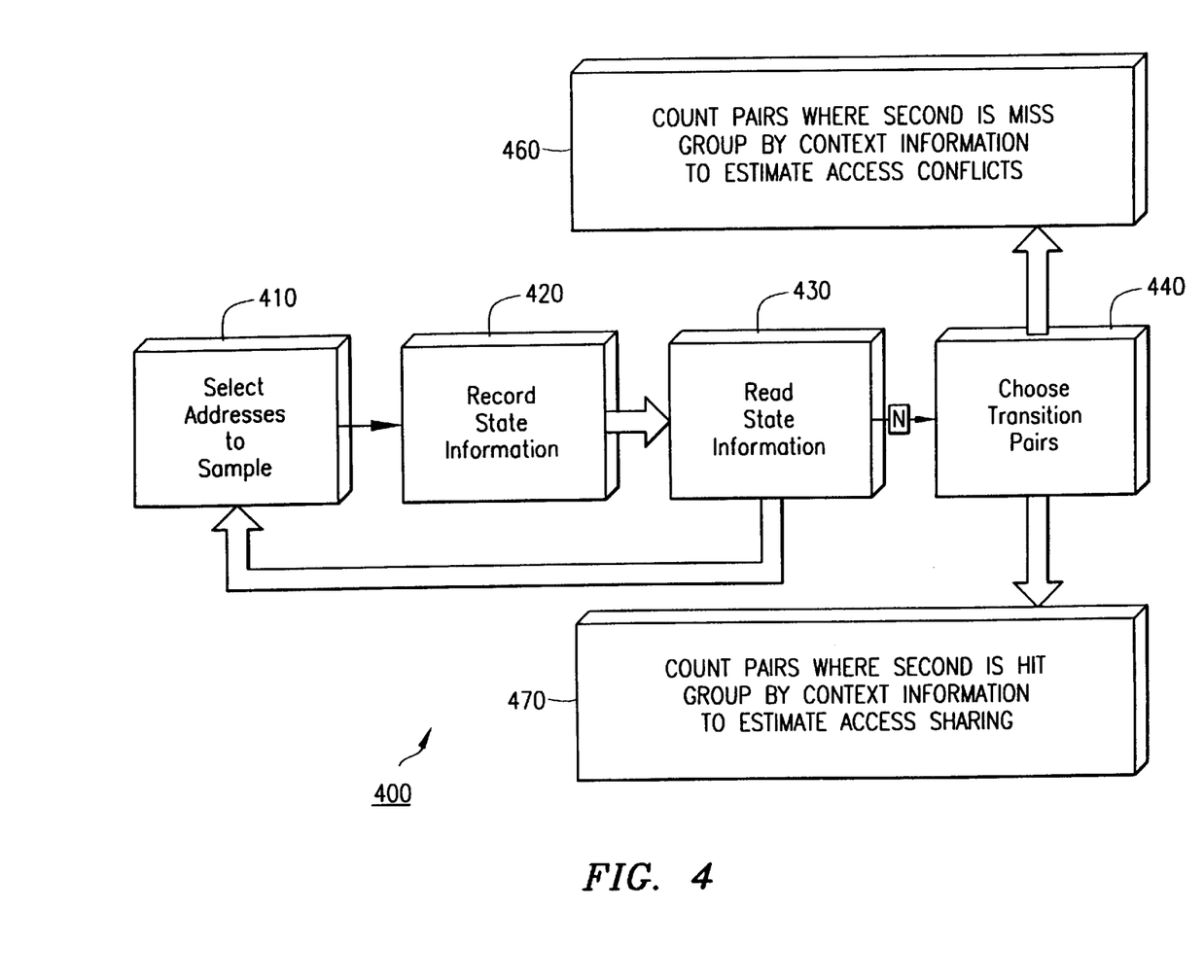
FIG. 4 is a flow diagram of a method for estimating sharing and conflict statistics about memory system interactions between computer system contexts.

The sampled information about memory system transactions can be used to compute a variety of statistics about memory system activity. This process 400 is shown in FIG. 4. The process involves repeatedly selecting a region of a memory to monitor, e.g., a specific cache block within a specific set-associative cache line within a specific cache memory, step 410, recording state information from multiple consecutive memory transactions that access this region step 420, and communicating this recorded state information to software step 430.

After a predetermined number of samples have been collected or a predetermined amount of time has elapsed, the sampling software can statistically analyze the recorded information to estimate a variety of properties about cache utilization and memory system interactions among contexts.

A typical way of using this approach is for the software to periodically choose a random cache block to monitor, and collect a sequence of samples for transactions that access this particular block. After a given period of time has elapsed, the software chooses a new random cache block to monitor, and the entire process 400 can be repeated. Over time, samples will accrue for all blocks in the cache.

This random sampling in the spatial dimension permits the estimation of statistics concerning sharing and conflicts in both space and time. Note that the random choice of the region to monitor can also be implemented by hardware logic. In general, it is also possible to monitor each region until a specified number of sample events 290 have occurred. The events 290 can be memory transactions to the region, or total memory system transactions, or elapsed time measured in processor clock cycles or other units.

For each transaction, it is possible to capture a variety of information, as described herein. For these analyses, the information of interest about each transaction includes its hit or miss status in the cache of interest, cache protocol state information about the block referenced by the transaction, the type of transaction (e.g., read, write, or invalidate), the virtual and physical addresses referenced by the transaction, the corresponding location within the cache (such as the block and/or line indices).

Additional recorded information identifies the context of the transaction, such as a cache coherency operation from another processor, a direct memory access from an input/output device, or an instruction execution from a particular process, thread, address space number, or hardware context.

The analysis of the samples includes first selecting a subset of the samples that are of interest step 440. In particular, a subset may be pairs of samples from consecutive accesses to a region, such as a specific cache block that also match additional functional criteria.

Because the selected transaction pair resulted from consecutive accesses to the same physical location in the cache, information recorded about the transactions can be used to estimate sharing or conflicts for this physical space in the cache. Also, statistics about frequencies of various state transitions in the cache protocol can be determined, because examining the protocol state on two consecutive transactions identifies the transition that must have taken place to go from the state in the first sample of the pair to the state in the second sample of the pair.

To estimate sharing, the analysis selects pairs where the second transaction in the pair was a cache hit in step 450. This indicates that there was sharing between the first and second transaction. By examining the context identifying information associated with both samples, it is possible to determine which contexts usefully shared this physical space during the sampled time interval. By aggregating this information over many such pairs of samples, one can statistically estimate metrics concerning both intra-context and inter-context sharing of physical locations.

One useful metric is determined by counting the number of pairs here the first pair in the sample matches one specific context, and where the second pair in the sample matches a second specific context, effectively yielding a matrix of counts that is indexed by the identifiers of the first and second contexts. Similarly, by analyzing pairs where the second sampled transaction experienced a cache miss in step 460, one can statistically estimate metrics concerning intra-context and inter-context conflict for physical locations.

An alternative use of this hardware is to choose a specific cache region to monitor. The chosen region corresponds to the space in the cache that stores a particular program variable or data structure. By collecting samples and filtering the samples to obtain samples pairs where at least one of the transactions involves the variable or data structure of interest, it is possible to estimate cache conflict rates and to identify other specific program variables or data structures that are the sources of the conflicts.

This estimation can be done dynamically to enable on-line program debugging or optimization of performance problems within a running program or system. This technique enables programmers to interactively debug memory system performance by identifying conflicts in executing programs that are investigated. Similar techniques can be used by adaptive run time software to avoid severe cache conflicts through dynamic data relocation.

Estimating Statistics of Properties of Memory Transactions

Figure 5:
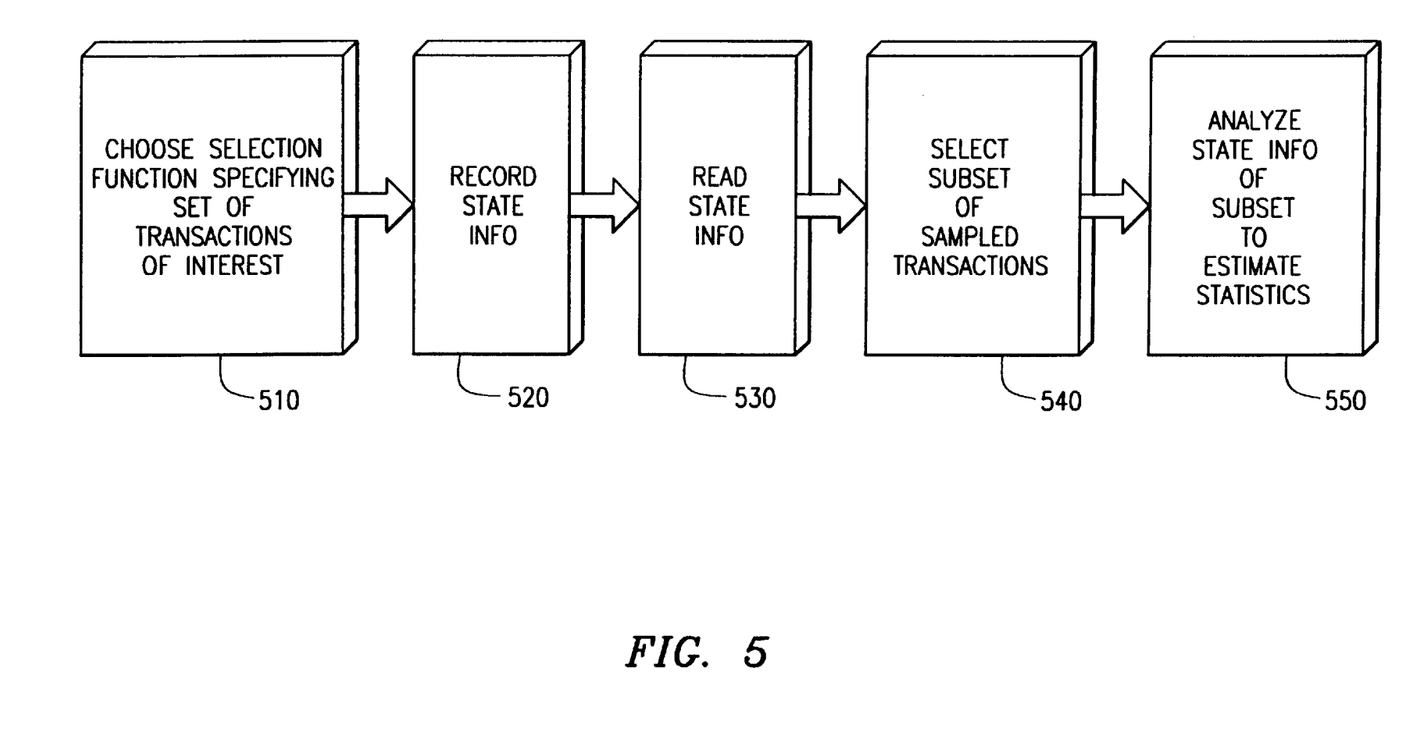
FIG. 5 is a flow diagram of a method for estimating statistics of properties of memory system transactions.

The sampled information about memory system transactions can be used to compute a variety of statistics about memory system activity. This process 500 is illustrated in FIG. 5, and is accomplished using the hardware previously described by means of the following steps:

Step 1: Choose a selection function to identify memory transactions of interest 510.

Step 2: Record information about selected memory system transactions 520.

Step 3: Communicate the recorded state information to software 530.

Step 4: Select a subset of the transactions that are considered to be of interest 540.

Step 5: Analyze this subset to estimate various statistics or properties 550.

The recorded state information includes a wealth of information about each memory transaction, so many useful statistics can be computed.

Information in the samples can include:
  addresses referenced by the memory transaction;
  context identifying information, such as a process identifier, thread identifier, hardware context identifier, address space number, a direct memory access device identifier, or a processor identifier of cache coherency traffic;
  status information for each level in the memory hierarchy referenced by the transaction, such as cache hit/miss, dirty/clean, and/or shared/exclusive status;

Analyze the Recorded State Information

Sampling individual memory system transactions makes it possible to compute a variety of statistical metrics about distributions of properties of memory system behavior. For example, it is possible to estimate distributions of latencies to service memory requests, or to estimate rates of cache hits at a particular level or region in the memory hierarchy. Filtering mechanisms can be used to identify subsets of the recorded transactions that are of interest, permitting the statistics to focus in on particular aspects of the memory system that are of interest, such as transactions to a particular region or level in the memory hierarchy, or a particular class of transactions such as reads, writes, or invalidates.

After a set of samples of interest has been identified, standard statistical techniques can be used to derive averages, standard deviations, histograms and other statistics about the samples of interest. Averages can be used to estimate rates of occurrence for particular events online 290 of FIG. 2, such as cache hits or misses, or evictions.

It is also possible to estimate the fraction of requests due to reads, writes, or invalidates. These rates can also be estimated with respect to a particular context, so as to estimate metrics such as cache hit rates per process, or average memory system latency experienced by a thread. It is also possible to estimate the fraction of a level of the memory hierarchy that is being consumed by a particular context.

Standard error estimation techniques can be used to obtain confidence intervals on the accuracy of the derived statistics.

In particular, for statistics that involve a number of samples with a specific property, error bounds can be approximated using the reciprocal of the square root of the number of samples with that property. These error bounds can also be used to dynamically control the rate at which selected transactions are sampled, so as to tradeoff accuracy with sampling overhead.

When the recorded state information includes latency information, either in the form of the latency required to process the memory transaction, or in terms of the latency between two consecutive sampled memory transactions, the information can be used to compute latency-based statistics. Latency is typically measured in units of time, such as processor clock cycles, but may also be measured in other units, such as the number of memory transactions processed.

Instruction and Data Relocation

In a very general sense, processors execute instructions that operate on data. In many modern computer systems, the instructions and data are usually maintained as separate structures using different memory pages because the access patterns for instructions is quite different than that for data. Virtual to physical memory mapping for instructions and data is usually performed by the operating system. Alternatively, relocation of structures can be done manually, or by compilers, linkers, and loaders. Some systems can relocate structures dynamically as the instructions execute.

Using the hardware described herein, it is possible to give feedback to a variety of interesting pieces of software. For example, sampled memory transaction state information can be used to drive, for example, page remapping policies, or to avoid self-interference by providing feedback to compilers, linkers, or loaders.

For example, software can aggregate conflicting addresses at the page level to inform dynamic page-remapping algorithms implemented by operating systems. It is also possible to provide interesting profiling tools that identify potential performance problems to programmers and users.

For example, it is now possible to estimate how often data are dirty when the data are evicted, and how often DMA transfers or cache coherency protocol transactions occur, giving a sense of how effectively the memory system is being used.

Page Replication and Migration in a Multiprocessor Computer System

In non-uniform memory access (NUMA) multiprocessor systems, each processor has portions of the memory system that it can access more quickly (or with higher bandwidth) than can other pieces of the memory system. In order to improve performance, data (which can either be program data or instructions) that are frequently accessed by a processor can be moved to a region of the memory system that can be accessed more quickly by that processor.

Figure 6:
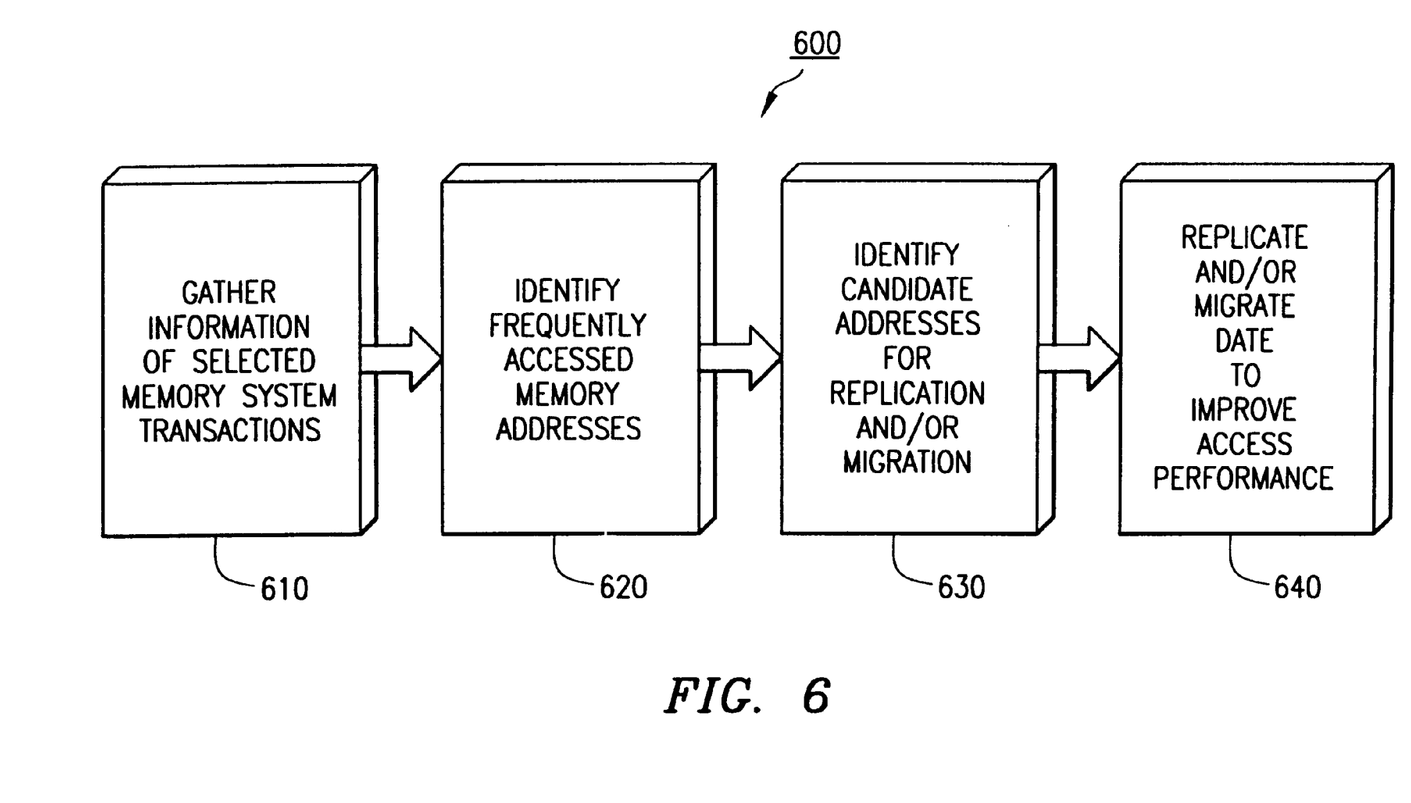
FIG. 6 is a flow diagram of a method for using statistics about memory system behavior to make data replication and migration decisions.

This motion can be accomplished in two ways. The data can be replicated by making multiple copies of the data. Ideally, the data are judiciously "scattered" throughout the memory system. Alternatively, the data can be migrated by actually moving the data into a lower latency or higher bandwidth memory. The steps 600 involved are illustrated in FIG. 6 and include the following:

Step 1: Record information about selected memory system transactions 610.

Step 2: Identify frequently accessed regions of memory (e.g., pages) 620.

Step 3: Identify candidates for replication and migration 630.

SDtep 4: Replicate and/or migrate appropriate data to improve specific metrics 640.

The key to this process is embodied in Step 2 and Step 3. Information about which pieces of data, e.g., information about referenced virtual and physical addresses, that are being frequently accessed by which processor, and also which pieces of data incur substantial cache misses or are experiencing high latencies in their access can be used to guide replication and/or migration decisions.

Information about the type of accesses (e.g., reads, writes, and invalidates) can further guide the decision of whether to replicate or to migrate, or to leave the data in place. For example, data that are frequently written by multiple processors (e.g., write-shared pages) should probably not be replicated or migrated, while data that are frequently read but only infrequently written (e.g., read-shared pages) are good candidates for replication. Pages that are heavily accessed by only a single processor are good candidates for migration to a memory that is closer to the accessing processor. This information can be gathered by statistical sampling of memory system transaction information as described herein.

The information about memory system transactions can be aggregated dynamically and can be used in an on-line manner to dynamically control the replication and migration policies of the computer system. Typically, replication and migration are handled by the operating system, but they can also be handled by other software or hardware layers.

There are several potential performance metrics that replication or migration policies can attempt to improve, including an increase in total system throughput, an increase in throughput for particular high-priority jobs, a decrease in traffic between processors and memories, a decrease in total memory latency, or an overall increase in system performance.

Context Scheduling

Because caches in a hierarchical memory shared data originating from various hardware contexts, threads executing in different hardware contexts compete for lines in a cache. Therefore, it is desired to schedule threads so that resource conflicts are minimized.

Judicious scheduling is especially important for multi-threaded processors where memory references from different hardware contexts are interleaved at a very fine-grained level, and the relevance is increased when these contexts share memory system resources, such as caches. However, it is also important for single-threaded processors when the caches are large enough relative to the number of memory transactions made by a thread during a scheduling quantum. Then there is some hope of retaining some useful cache contents when the next quantum is allocated to a particular context. All of these scheduling decisions can dynamically adapt to feedback gathered from statistical sampling of memory system transactions during on-line operation.

Figure 7:
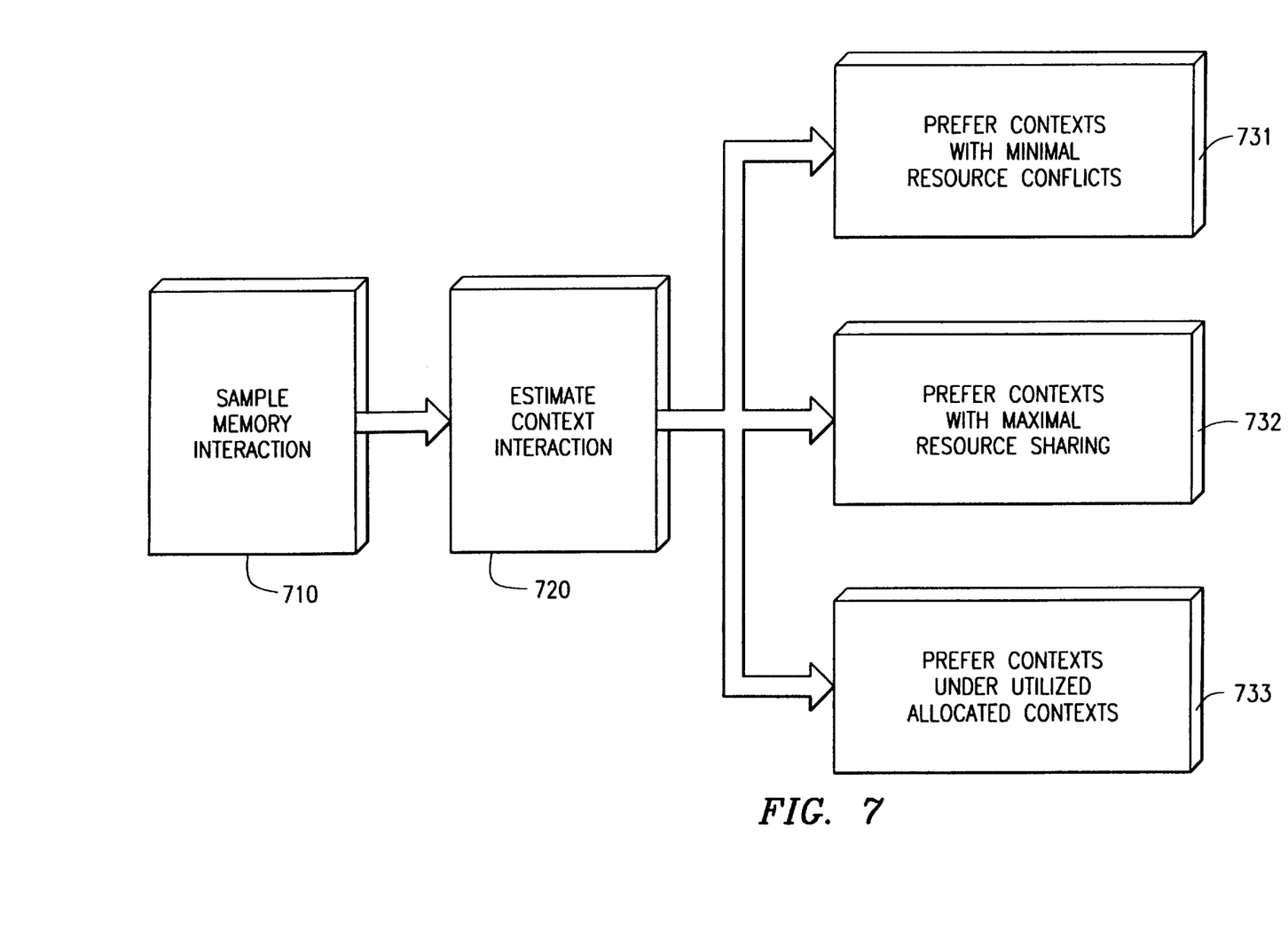
FIG. 7 is a flow diagram of a method for using statistics about memory system interactions to make context scheduling decisions.

This can be done by sampling memory system transaction information as described herein. Operating system software can benefit from considering various aspects of memory reference patterns of threads or processes when making scheduling decisions. This process 700 is illustrated in FIG. 7.

Step 710 samples transactions for specified contexts. By capturing old and new context identifiers as part of a cache monitor, the operating system software can statistically estimate the degree to which different contexts are sharing and conflicting in the cache in 720. These estimates can be used by context schedulers in steps 731–733 to preferentially schedule contexts. The scheduling decisions 731–733, described below, can benefit from considering various metrics, including increasing the amount of sharing among contexts competing for memory resources or decreasing conflicts sharing among contexts competing for memory resources.

Co-scheduling.

For example, it makes sense to preferentially co-schedule a thread that has a large cache footprint concurrently with a thread that is making only modest use of the cache, because the memory system demands of such threads complement each other, thereby increasing sharing. Also, it makes sense to use, as much as possible, non-overlapping regions of the cache.

On the other hand, the operating system software should strive to minimize resource conflicts, for example, avoiding co-scheduling two threads with large cache footprints, where possible, because this will result in many more conflict misses as the threads evict each others useful data from the cache, thereby decreasing conflicts.

Share-based Scheduling

Share-base or proportional-share scheduling policies ideally want to give each context a specified share of each cache memory in the memory hierarchy. With the present sampling technique, it is possible to statistically estimate the portion of cache occupied by each context in step 720. This allows the scheduler to base its decisions on metrics such as giving each process the specified share of the memory system resources, effectively partitioning memory system resources among contexts in proportion to their needs.

Allocation-based Scheduling

Each context that can be scheduled has associated with it allocated resources, such the amount of cache it can use. Contexts which use more than their allotted share can be slowed down or suspended. Similarly contextsthat underutilize their allocated share can be favored. While some contexts are suspended, others can increase their share of the cache. The suspended contexts can be allowed to continue after its cache usage has decreased as a result of increased cache pressure from other active contexts. This can be distinguished from known approaches that generally do not allow information to be monitored at the cache line or block level, other than through simulation.

All of these scheduling decisions can dynamically adapt to feedback gathered from statistical sampling of memory system transactions during on-line operation.

The foregoing description has been directed to specific embodiments. It will be apparent to those skilled in the art that modifications may be made to the described embodiments, with the attainment of all or some of the advantages. Therefore, it is the object of the appended claims to cover all such variations and modifications as come within the spirit and scope of the invention.

We claim:

1. A method of analyzing memory transaction processed by memories of a computer system, comprising the steps of:

selecting a set of addresses of the memories;

recording state information from a plurality of consecutive predetermined memory transactions to the selected addresses while the selected transactions are processed by the memories;

repeating the selecting and the recording steps until a termination condition is reached; and statistically analyzing the recorded state information to estimate statistics of properties of the memory interactions among contexts in the computer system;

wherein the selected transactions are a pair of consecutive accesses to an identical address and wherein the number of selected pairs in which identifying context information in the first transaction in the pair matches a first specified context and in which identifying context information in the second transaction in the pair matches a second specified context.

2. The method of claim 1 wherein the terminating condition is repeating the selecting and the recording steps a predetermined number of times.

3. The method of claim 1 wherein the terminating condition is repeating the selecting and the recording steps a predetermined length of time.

4. The method of claim 1 wherein the set of selected addresses specify specific regions of the memory, the specific regions including particular cache lines.

5. The method of claim 1 wherein the set of selected addresses specify specific regions of the memory, the specific regions including particular cache blocks.

6. The method of claim 1 wherein the recorded state information includes cache hit/miss status of the selected transactions.

7. The method of claim 1 wherein the recorded state information includes cache protocol state information of cache blocks accessed by the selected transactions.

8. The method of claim 1 wherein the recorded state information includes types of the selected transactions, the types including read, write, direct memory access, coherency message, and invalidate.

9. The method of claim 1 wherein the recorded state includes a physical address of a particular cache block.

10. The method of claim 1 wherein the recorded state includes contexts of the selected transactions, the contexts including process identifiers, thread identifiers, hardware context identifiers, address space numbers, direct memory access device identifier, and processor identifier of cache coherency traffic identifier.

11. The method of claim 1 wherein the recorded state information includes addresses of the selected memory transaction, the addresses including physical memory addresses and virtual memory addresses.

12. The method of claim 1 wherein the second selected transaction of the pair suffers a cache hit.

13. The method of claim 1 wherein the second selected transaction of the pair suffers a cache miss.

14. The method of claim 13 wherein the analysis computes intra-context and inter-context sharing metrics by counting the number of selected pairs in which the identifying context information in the first transaction in the pair matches a first specified context and in which the identifying context information in the second transaction in the pair matches a second specified context.

15. The method of claim 14 wherein the sharing metrics are maintained by updating a matrix, with rows indexed by the context identifying information of the first transaction in the pair and with columns indexed by the context identifying information of the second transaction in the pair.

16. The method of claim 1 wherein the set of addresses is randomly selected.

17. The method of claim 14 wherein the sharing metrics are maintained by updating a matrix, the matrix having rows indexed by the context identifying information of the first transaction in the pair and with columns indexed by the context identifying information of the second transaction in the pair.

18. The method of claim 1 wherein the state information is recorded until a specified number of sampling events have occurred.

19. The method of claim 1 wherein the sampling events are selected from a set that includes hit/miss events, valid/invalid events, dirty events, memory accessed to the selected addresses, and memory accesses to any memory address.

20. The method of claim 1 wherein the set of addresses correspond to a specified program variable of a program.

21. The method of claim 1 wherein the set of addresses correspond to a specified data structure of a program.

22. A system for analyzing memory transactions comprising:
a microprocessor;
a storage device connected to the microprocessor;
a plurality of instructions stored on the storage device, the plurality of instructions being readable by the microprocessor to thereby cause the microprocessor to:
select addresses of at least a first memory;
record state information from a plurality of memory transactions to the selected addresses responsive to the plurality of memory transactions being processed;
repeat the selecting and the recording steps until a termination condition is reached; and
statistically analyze the recorded state information;
wherein the plurality of memory transactions included a pair of consecutive accesses to an identical address and wherein the number of selected pairs in which identifying context information in a first of the plurality of memory transactions in the pair matches a first specified context and in which identifying context information in a second of the plurality of memory transactions in the pair matches a second specified context.

23. The system of claim 1 wherein the context includes one of process identifiers, thread identifiers, hardware context identifiers, address space numbers, direct memory access device identifier, and processor identifier of cache coherency traffic identifier.

* * * * *

UNITED STATES PATENT AND TRADEMARK OFFICE
CERTIFICATE OF CORRECTION

PATENT NO. : 6,237,059 B1
DATED : May 22, 2001
INVENTOR(S) : Dean et al.

It is certified that error appears in the above-identified patent and that said Letters Patent is hereby corrected as shown below:

<u>Title page,</u>
Under FOREIGN PATENT DOCUMENTS, line 1, reads:
"0 086 380 A2     8/1986  (EP) ..................................G11C/9/06"
should read -- 0 086 380 A2     8/1983  (EP) ......................G11C/9/06 --;

U.S. PATENT DOCUMENTS, line 51, reads
"5,922,070     7/1999  Swoboda ......................... 712/244"
should read -- 5,922,070  7/1999  Swoboda et al. ......................... 712/244 --

Signed and Sealed this

Fifteenth Day of January, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,237,059 B1  Page 1 of 1
DATED : May 22, 2001
INVENTOR(S) : Dean et al.

It is certified that error appears in the above-identified patent and that said Letters Patent is hereby corrected as shown below:

Column 4,
Line 7, reads "buffers 301-303, and sampling software 260." it should read:
-- buffers 300-302 and sampling software 280. --;
Line 14, reads "include the type of the access operation to be performed" it should read:
-- include the type of access operation to be performed --.
Line 20, reads "ber of low-order (e.g. 8-16) bits are used to form an index" it should read: -- ber of low-order (e.g. 8-16) bits is used to form an index --.

Column 9,
Line 10, reads "cache block to sampler 270 is avoided. The design can" it should read:
-- cache block to the sampler 260 is avoided. The design can --
Line 16, reads "flexible control of a wide range of monitoring techniques to" it should read: -- flexible control of a wide range of monitoring techniques may --
Line 26, reads "By using software the monitor register 264" it should read:
-- By using software the monitor register 263 --

Column 14,
Line 30, reads "allocated resources, such the amount of cache it can use." it should read:
-- allocated resources, such as the amount of cache it can use --;
Line 36, reads "after its cache usage has decreased as a result of increased" it should read: -- after their cache usage has decreased as a result of increased --.

Signed and Sealed this

Twenty-third Day of July, 2002

Attest:

JAMES E. ROGAN
*Attesting Officer*   *Director of the United States Patent and Trademark Office*